(12) United States Patent
Alizadeh-Shabdiz et al.

(10) Patent No.: US 8,090,386 B2
(45) Date of Patent: Jan. 3, 2012

(54) ESTIMATION OF SPEED AND DIRECTION OF TRAVEL IN A WLAN POSITIONING SYSTEM

(75) Inventors: Farshid Alizadeh-Shabdiz, Wayland, MA (US); Edward James Morgan, Needham, MA (US); Kaveh Pahlavan, Newton, MA (US)

(73) Assignee: Skyhook Wireless, Inc., Boston, MA (US)

(*) Notice: Subject to any disclaimer, the term of this patent is extended or adjusted under 35 U.S.C. 154(b) by 0 days.

(21) Appl. No.: 12/945,266

(22) Filed: Nov. 12, 2010

(65) Prior Publication Data
US 2011/0058495 A1    Mar. 10, 2011

Related U.S. Application Data

(63) Continuation of application No. 11/430,079, filed on May 8, 2006, now Pat. No. 7,835,754.

(51) Int. Cl.
*H04W 24/00* (2009.01)
*H04W 4/00* (2009.01)

(52) U.S. Cl. .................. 455/456.1; 455/456.3; 370/338; 370/331

(58) Field of Classification Search .................. 455/456, 455/456.5, 456.1, 456.2, 522, 515, 438, 436, 455/418, 404.2, 440, 441; 342/387, 457; 370/338, 328, 332, 295
See application file for complete search history.

(56) References Cited

U.S. PATENT DOCUMENTS

| | | | |
|---|---|---|---|
| 6,097,336 A | 8/2000 | Stilp | |
| 6,272,405 B1 | 8/2001 | Kubota et al. | |
| 6,678,611 B2 | 1/2004 | Khavakh et al. | |
| 6,888,811 B2 | 5/2005 | Eaton et al. | |
| 6,978,023 B2 | 12/2005 | Dacosta | |
| 7,020,442 B2 | 3/2006 | Najafi et al. | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,250,907 B2 | 7/2007 | Krumm et al. | |
| 7,305,245 B2 | 12/2007 | Alizadeh-Shabdiz et al. | |
| 7,397,424 B2 | 7/2008 | Houri | |
| 7,403,762 B2 | 7/2008 | Morgan et al. | |
| 7,414,988 B2 | 8/2008 | Jones et al. | |

(Continued)

FOREIGN PATENT DOCUMENTS
WO   WO-2007/133970   11/2007
(Continued)

OTHER PUBLICATIONS

"Delta Encoding", Wikipedia, retrieved from <http://en.wikipedia.org/wiki/Delta_encoding>, on Mar. 1, 2006. (1 page).

(Continued)

*Primary Examiner* — Kiet Doan
(74) *Attorney, Agent, or Firm* — Wilmer Cutler Pickering Hale and Dorr LLP

(57) ABSTRACT

A method for estimating the speed and bearing of a Wi-Fi enabled device using WLAN radio signals in a WLAN based location service is provided. A method used to estimate a speed of travel of a Wi-Fi enabled device comprises the Wi-Fi enabled device receiving signals transmitted by Wi-Fi access points in range of the Wi-Fi enabled device, and using the signals to estimate the speed of and/or direction of travel of the Wi-Fi enabled device.

4 Claims, 8 Drawing Sheets

U.S. PATENT DOCUMENTS

| | | | |
|---|---|---|---|
| 7,433,694 | B2 | 10/2008 | Morgan et al. |
| 7,471,954 | B2 | 12/2008 | Brachet et al. |
| 7,474,646 | B2 | 1/2009 | Tamaki |
| 7,474,897 | B2 | 1/2009 | Morgan et al. |
| 7,493,127 | B2 | 2/2009 | Morgan et al. |
| 7,502,620 | B2 | 3/2009 | Morgan et al. |
| 7,515,548 | B2 | 4/2009 | Chandra et al. |
| 7,551,579 | B2 | 6/2009 | Alizadeh-Shabdiz et al. |
| 7,551,929 | B2 | 6/2009 | Alizadeh-Shabdiz et al. |
| 7,768,963 | B2 | 8/2010 | Alizadeh-Shabdiz |
| 7,769,396 | B2 | 8/2010 | Alizadeh-Shabdiz et al. |
| 7,818,017 | B2 | 10/2010 | Alizadeh-Shabdiz et al. |
| 2002/0147024 | A1* | 10/2002 | Wan ............ 455/515 |
| 2002/0167444 | A1 | 11/2002 | Lee |
| 2003/0054830 | A1 | 3/2003 | Williams et al. |
| 2003/0125045 | A1 | 7/2003 | Riley et al. |
| 2003/0225893 | A1 | 12/2003 | Roese et al. |
| 2004/0019679 | A1 | 1/2004 | E et al. |
| 2004/0039520 | A1 | 2/2004 | Khavakh et al. |
| 2004/0081133 | A1 | 4/2004 | Smavatkul et al. |
| 2004/0087317 | A1 | 5/2004 | Caci |
| 2004/0110524 | A1* | 6/2004 | Takano et al. ............ 455/522 |
| 2004/0162090 | A1 | 8/2004 | Suryanarayana et al. |
| 2004/0166864 | A1 | 8/2004 | Hill et al. |
| 2004/0203420 | A1 | 10/2004 | Rick et al. |
| 2004/0205234 | A1 | 10/2004 | Barrack et al. |
| 2004/0259546 | A1 | 12/2004 | Balachandran et al. |
| 2005/0020266 | A1 | 1/2005 | Backes et al. |
| 2005/0037775 | A1 | 2/2005 | Moeglein et al. |
| 2005/0192024 | A1 | 9/2005 | Sheynblat |
| 2005/0215201 | A1 | 9/2005 | Cao et al. |
| 2005/0246334 | A1 | 11/2005 | Tao et al. |
| 2005/0270236 | A1 | 12/2005 | Krumm et al. |
| 2005/0276276 | A1 | 12/2005 | Davis |
| 2006/0009235 | A1 | 1/2006 | Sheynblat et al. |
| 2006/0025153 | A1 | 2/2006 | Inaba |
| 2006/0046709 | A1 | 3/2006 | Krumm et al. |
| 2006/0078122 | A1 | 4/2006 | Dacosta |
| 2006/0089157 | A1 | 4/2006 | Casey et al. |
| 2006/0095348 | A1 | 5/2006 | Jones et al. |
| 2006/0095349 | A1 | 5/2006 | Morgan et al. |
| 2006/0197704 | A1 | 9/2006 | Luzzatto et al. |
| 2006/0200843 | A1 | 9/2006 | Morgan et al. |
| 2006/0217131 | A1 | 9/2006 | Alizadeh-Shabdiz et al. |
| 2006/0221918 | A1 | 10/2006 | Wang |
| 2006/0240840 | A1 | 10/2006 | Morgan et al. |
| 2006/0256803 | A1 | 11/2006 | Nakata et al. |
| 2007/0004428 | A1 | 1/2007 | Morgan et al. |
| 2007/0077968 | A1 | 4/2007 | Kuzminskiy |
| 2007/0097511 | A1 | 5/2007 | Das et al. |
| 2007/0126635 | A1 | 6/2007 | Houri |
| 2007/0139269 | A1 | 6/2007 | Chen et al. |
| 2007/0150516 | A1 | 6/2007 | Morgan et al. |
| 2007/0232892 | A1 | 10/2007 | Hirota |
| 2007/0258420 | A1 | 11/2007 | Alizadeh-Shabdiz et al. |
| 2007/0259624 | A1 | 11/2007 | Alizadeh-Shabdiz et al. |
| 2008/0008117 | A1 | 1/2008 | Alizadeh-Shabdiz et al. |
| 2008/0008118 | A1 | 1/2008 | Alizadeh-Shabdiz et al. |
| 2008/0008119 | A1 | 1/2008 | Alizadeh-Shabdiz et al. |
| 2008/0008121 | A1 | 1/2008 | Alizadeh-Shabdiz et al. |
| 2008/0033646 | A1 | 2/2008 | Morgan et al. |
| 2008/0108371 | A1 | 5/2008 | Alizadeh-Shabdiz et al. |
| 2008/0176583 | A1 | 7/2008 | Brachet et al. |
| 2008/0242305 | A1 | 10/2008 | Kahlert et al. |
| 2008/0248741 | A1 | 10/2008 | Alizadeh-Shabdiz et al. |
| 2008/0248808 | A1 | 10/2008 | Alizadeh-Shabdiz et al. |
| 2009/0075672 | A1 | 3/2009 | Jones et al. |
| 2009/0149197 | A1 | 6/2009 | Morgan et al. |
| 2009/0154371 | A1 | 6/2009 | Alizadeh-Shabdiz et al. |
| 2009/0175189 | A1 | 7/2009 | Alizadeh-Shabdiz et al. |
| 2009/0252138 | A1 | 10/2009 | Alizadeh-Shabdiz et al. |
| 2009/0303112 | A1 | 12/2009 | Alizadeh-Shabdiz |
| 2009/0303113 | A1 | 12/2009 | Alizadeh-Shabdiz |
| 2009/0303114 | A1 | 12/2009 | Alizadeh-Shabdiz |
| 2009/0303115 | A1 | 12/2009 | Alizadeh-Shabdiz |
| 2009/0303119 | A1 | 12/2009 | Alizadeh-Shabdiz |
| 2009/0303120 | A1 | 12/2009 | Alizadeh-Shabdiz |
| 2009/0303121 | A1 | 12/2009 | Alizadeh-Shabdiz et al. |
| 2009/0310585 | A1 | 12/2009 | Alizadeh-Shabdiz |
| 2009/0312035 | A1 | 12/2009 | Alizadeh-Shabdiz |
| 2009/0312036 | A1 | 12/2009 | Alizadeh-Shabdiz |
| 2010/0052983 | A1 | 3/2010 | Alizadeh-Shabdiz |
| 2011/0012780 | A1 | 1/2011 | Alizadeh-Shabdiz |
| 2011/0012784 | A1 | 1/2011 | Alizadeh-Shabdiz |
| 2011/0035420 | A1 | 2/2011 | Alizadeh-Shabdiz et al. |
| 2011/0045840 | A1 | 2/2011 | Alizadeh-Shabdiz et al. |
| 2011/0058495 | A1 | 3/2011 | Alizadeh-Shabdiz et al. |
| 2011/0074626 | A1 | 3/2011 | Alizadeh-Shabdiz et al. |
| 2011/0080317 | A1 | 4/2011 | Alizadeh-Shabdiz et al. |
| 2011/0080318 | A1 | 4/2011 | Alizadeh-Shabdiz et al. |
| 2011/0080841 | A1 | 4/2011 | Alizadeh-Shabdiz et al. |
| 2011/0164522 | A1 | 7/2011 | Alizadeh-Shabdiz et al. |

FOREIGN PATENT DOCUMENTS

| | | |
|---|---|---|
| WO | WO-2008/124316 | 10/2008 |

OTHER PUBLICATIONS

"Huffman Coding", Wikipedia, retrieved from <http://en.wikipedia.org/wiki/Huffman_coding> on Mar. 1, 2006. (6 pages).

"Terminal Equipment and Protocols for Telematic Services: Information Technology-Digital Compression and Coding of Continuous-Tome Still Images—Requirements and Guidelines," International Telecommunication Union, Sep. 1992.

Griswold et al., "ActiveCampus—Sustaining Educational Communities through Mobile Technology." UCSD CSE Technical Report #CS200-0714, 2002. (19 pages).

Hazas, M., et al., "Location-Aware Computing Comes of Age," IEEE, vol. 37, Feb. 2004.

Hellebrandt, M., et al., "Estimating Position and Velocity of Mobile in a Cellular Radio Network," IEEE Transactions on Vehicular Technology, vol. 46, No. 1, Feb. 1997.

International Search Report and Written Opinion of the International Searching Authority, the United States Patent and Trademark Office, for International Application No. PCT/US2006/045327, dated Jun. 24, 2008, 7 pages.

International Search Report and Written Opinion of the International Searching Authority, the United States Patent and Trademark Office, for International Application No. PCT/US2008/058345, dated Jun. 30, 2008, 7 pages.

International Search Report, International Application No. PCT/US05/39208, mailed Jan. 29, 2008. (3 pages).

Kawabata, K. et al., "Estimating Velocity Using Diversity Reception," IEEE, 1994, 371-374.

Kim, M., et al., "Risks of using AP locations discovered through war driving,"; Pervasive Computing; May 19, 2006; p. 67-81 (15 pages).

Kirsner, S., "One more way to find yourself," The Boston Globe, May 23, 2005, Retrieved from www.boston.com.

Krumm, J., et al., "LOCADIO: Inferring Motion and Location from Wi-Fi Signal Strengths," First Annual International Conference on Mobile and Ubiquitous Systems: Networking and Services, Aug. 2004.

Kwan, M., "Graphic Programming Using Odd or Even Points," Chinese Math. 1, 1960, pp. 273-277.

LaMarca, A., et al., "Place Lab: Device Positioning Using Radio Beacons in the Wild,"; Pervasive Computing; Oct. 2004; p. 116-133.

Muthukrishnan, K., et al., "Towards Smart Surroundings: Enabling Techniques and Technologies for Localization," Lecture Notes in Computer Science, vol. 3479, May 2005, 11 pages.

International Search Report and Written Opinion of the International Searching Authority, The United States Patent and Trademark Office, for International Application No. PCT/US2007/068254, dated Oct. 3, 2008, 7 pages.

Supplementary European Search Report and Written Opinion for European Application No. 07761897, dated Jun. 2, 2010, 6 pages.

* cited by examiner

ESTIMATION OF SPEED AND DIRECTION OF TRAVEL IN A WLAN POSITIONING SYSTEM

CROSS-REFERENCE TO RELATED APPLICATIONS

This application is a continuation of prior U.S. patent application Ser. No. 11/430,079, now U.S. Pat. No. 7,835,754, filed May 8, 2006, entitled Estimation of Speed and Direction of Travel in a WLAN Positioning System, which is incorporated by reference herein.

This application is related to the following U.S. Patent Applications:
U.S. patent application Ser. No. 11/429,862, filed May 8, 2006, entitled Estimation of Speed of Travel Using the Dynamic Signal Strength Variation of Multiple WLAN Access Points;
U.S. patent application Ser. No. 11/430,064, now U.S. Pat. No. 7,551,929, filed May 8, 2006, entitled Estimation of Speed and Direction of Travel In a WLAN Positioning System Using Multiple Position Estimations;
U.S. patent application Ser. No. 11/430,222, now U.S. Pat. No. 7,515,578, filed May 8, 2006, entitled Estimation of Position Using WLAN Access Point Radio Propagation Characteristics in a WLAN Positioning System; and
U.S. patent application Ser. No. 11/430,224, now U.S. Pat. No. 7,551,579, filed May 8, 2006, entitled Calculation of Quality of WLAN Access Point Characterization For Use in a WLAN Positioning System;
the contents of which are hereby incorporated by reference.

BACKGROUND OF THE INVENTION

1. Field of the Invention

The invention generally relates to calculating speed and direction of travel in a positioning system, and, more specifically, the use of WLAN access points signals to calculate speed and direction of travel.

2. Description of Related Art

Position, speed of travel, and direction of travel (i.e. bearing) are basic components of navigation systems and any Location Based Services (LBS). Speed and bearing estimation are not only reported to the end users, but they are also used by the location services and systems to rectify position estimation. The information may also be used by navigation applications to translate a distance to a time duration. Location and speed estimation are also used extensively in cellular networks to optimize system parameters, like dynamic channel assignment and handover algorithms.

Outdoor and indoor WLAN based positioning systems have been explored by a couple of research labs, but none of them included speed and bearing estimation in their system. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system, and it was evaluated through several small projects at Dartmouth college (e.g., M. Kim, J. J. Fielding, and D. Kotz, "Risks of using AP locations discovered through war driving").

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness (LoCA 2005)* at Pervasive 2005, May 2005, and Hazas, M., Scott, J., Krumm, J.: Location-Aware Computing Comes of Age, IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding, typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly, outdoor radio propagation is fundamentally different than indoor radio propagation, rendering these indoor positioning algorithms almost useless in a wide-area scenario.

Speed estimation of WLAN users has drawn little attention. There is one paper related to this topic, which covers the indoor environment. Using power variation of signal strength of WLANs to detect stationary users inside a building was proposed by Krumm and Harvitz. (See John Krumm and Eric Harvitz, "LOCADIO: Inferring Motion and Location from WLAN Signal Strengths" Proc. Of Mobiquitous, pp 4-14, Aug. 22-26, 2004). The proposed algorithm is based on measuring the variance of the signal strength of the strongest access point in an indoor environment. In this article, the user's movement is captured in two states, which are "still" and "moving" states. The proposed algorithm to detect still state is based on detailed survey of the building and finding transition probability between "still" and "moving" states as a function of the building's floor plan. This article uses standard deviation of power samples to capture the power variation. In addition, a detailed site survey was required.

Estimation of speed of travel by using radio wave propagation characteristics is not a new idea, and different methods have been suggested to calculate user speed by using radio waves. The common way of estimating speed of a receiver relative to the transmitter is based on measuring the Doppler frequency. Estimating speed based on Doppler frequency needs the exact knowledge of the transmit frequency and angle of arrival of radio waves.

Due to shadowing and multi-path effects, conventional speed estimation methods cannot estimate the speed of WLAN users accurately. For example, Doppler frequency cannot be measured directly since the WLAN access point local oscillator is not precise enough, and the transmit frequency is not known accurately. Also, the multi-path effect causes different path length for the received signals.

There are millions of commercial and private WLANs deployed so far and this number is growing everyday. Thus, it is desirable to use WLAN access points to estimate speed and direction of travel. The speed of a user can be estimated by using transitional features of radio waves received from one or more WLAN access points. Moving out of coverage area of some access points and entering coverage area of other access points maintains continuity of estimation over time.

Detecting zero speed is another challenging issue for WLAN users, since the environment surrounding a WLAN receiver in a metropolitan area is changing all the time, and as a result, the received signal characteristics is changing constantly.

A WLAN positioning system provides a systematic method and a methodology for gathering reference location data to enable a commercial positioning system using public and private 802.11 access points. Preferably, the data is gathered in a programmatic way to fully explore and cover the streets of a target region. The programmatic approach identifies as many Wi-Fi access points as possible.

FIG. 1 depicts a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

BRIEF SUMMARY OF THE INVENTION

The invention provides methods for estimating the speed and bearing in a WLAN based location service.

Under one aspect of the invention, a method used to estimate a speed of travel of a Wi-Fi enabled device comprises the Wi-Fi enabled device receiving signals transmitted by Wi-Fi access points in range of the Wi-Fi enabled device, and using the signals to estimate the speed of travel of the Wi-Fi enabled device.

Under another aspect of the invention, a method used to estimate a speed of travel of a Wi-Fi enabled device comprises the Wi-Fi enabled device measuring an individual observation period for each of the Wi-Fi access points during which the Wi-Fi enabled device is receiving the signal transmitted by the individual Wi-Fi access point, the measuring occurring during a window of time. An average observation period is calculated based on the individual observation periods, and a speed of travel of the Wi-Fi enabled device is estimated using the average observation period.

Under another aspect of the invention, a method used to estimate a speed of travel of a Wi-Fi enabled device comprises the Wi-Fi enabled device receiving and measuring signal strengths of signals transmitted by a plurality of Wi-Fi access points in range of the Wi-Fi enabled device as received by the Wi-Fi enabled device, the measuring occurring during a window of time. Variations of the signal strengths as received by the Wi-Fi enabled device during the window of time are calculated. The signal strength variations are used to estimate a speed of travel of the Wi-Fi enabled device.

Under another aspect of the invention, a method used to estimate a speed of travel of a Wi-Fi enabled device comprises the Wi-Fi enabled device receiving signals transmitted by Wi-Fi access points in range of the Wi-Fi enabled device. A reference database is accessed to determine if the database contains characteristics of the Wi-Fi access points. If the database contains characteristics of the Wi-Fi access point, the characteristics are used to estimate a speed of travel of the Wi-Fi enabled device.

Under another aspect of the invention, a method for facilitating the determination of a speed of travel of the Wi-Fi enabled device within a location-based services system having a reference database of Wi-Fi access points in a target area, each Wi-Fi access point in the target area positioned at a corresponding geographical location, comprises the Wi-Fi enabled device receiving signals transmitted by Wi-Fi access points in range of the Wi-Fi enabled device during a window of time. The reference database is accessed to retrieve the corresponding geographical locations of the identified Wi-Fi access points. The geographical locations of the identified Wi-Fi access points are used to estimate a plurality of positions of the Wi-Fi enabled device occurring during the window of time, and a time value is associated with each of the estimated positions, each time value and position estimate forming one position/time pair of a plurality of pairs, the plurality having a first position occurring at a first time and a second position occurring at a second time. A lower speed bound is calculated based on a difference between the first position and time and second position and time. A plurality of speeds are calculated based on differences between consecutive pairs of the plurality of position/time pairs. An upper speed bound is the median speed from the plurality of speeds. A speed of travel of the Wi-Fi enabled device is calculated based on the upper speed bound and the lower speed bound.

Under another aspect of the invention, a method for facilitating the determination of a speed of travel of the Wi-Fi enabled device within a location-based services system having a reference database of Wi-Fi access points in a target area, each Wi-Fi access point in the target area positioned at a corresponding geographical location, comprises the Wi-Fi enabled device receiving signals transmitted by Wi-Fi access points in range of the Wi-Fi enabled device during a window of time. The reference database is accessed to retrieve the corresponding geographical locations of the identified Wi-Fi access points. The geographical locations of the identified Wi-Fi access points are used to estimate a plurality of distances traveled by the Wi-Fi enabled device, and a time value is associated with each estimated position. The speed of travel of the Wi-Fi enabled device is calculated based on the plurality of distances and associated times.

Under another aspect of the invention, a method used for facilitating the determination of a direction of travel of the Wi-Fi enabled device within a location-based services system having a reference database of Wi-Fi access points in a target area, each Wi-Fi access point in the target area positioned at a corresponding geographical location comprises the Wi-Fi enabled device receiving signals transmitted by Wi-Fi access points in range of the Wi-Fi enabled device. The reference database is accessed to retrieve the corresponding geographical locations of the identified Wi-Fi access points. The geographical locations of the identified Wi-Fi access points are used to estimate a sequence of positions of the Wi-Fi enabled device occurring during the window of time, the sequence having a first position. A plurality of intermediate directions of travel of the Wi-Fi enabled device are calculated based on the first position and the later positions of the sequence, each direction calculation using a different later position for each individual calculation. A direction of travel of the Wi-Fi enabled device is calculated based on the average of the plurality of intermediate directions of travel.

Under another aspect of the invention, a method for use in a location-based services system having a plurality of Wi-Fi access points in a target area, the Wi-Fi access points being positioned at geographic locations comprises estimating a first speed of travel of a Wi-Fi enabled device using a calculated average observation period during which the Wi-Fi enabled device is receiving signals transmitted by the Wi-Fi access points, estimating a second speed of travel of the Wi-Fi enabled device using calculated variations of signal strengths transmitted by the Wi-Fi access points as received by the Wi-Fi enabled device, and estimating a third speed of travel of the Wi-Fi enabled device using a plurality of estimated positions and associated time values of the Wi-Fi enabled device estimated using the geographic locations of the Wi-Fi access points. A fourth speed of travel of the Wi-Fi enabled device is calculated based on the first, second, and third estimated speeds of travel.

DETAILED DESCRIPTION

Embodiments of the invention facilitate the estimation of speed and bearing of a user equipped with a WLAN device by using WLAN radio signals. Proliferation of WLAN access points in recent years created a blanket of WLAN radio waves everywhere. Therefore, almost in any place, there is a great possibility to detect WLAN radio waves, especially in urban areas. There are important features embedded in WLAN and WLAN technology which makes it more attractive for speed and bearing estimation in metro areas, including that WLAN access points are stationary, WLAN access points can be found almost anywhere, the WLAN access points are sharing the same spectrum, and the spectrum used by WLAN access points is free.

Embodiments of the invention provide a system and a methodology for continuously maintaining and updating speed and bearing estimation of a user using radio waves of public and private WLAN access points. The user scans and detects public and private WLAN access points and also logs Received Signal Strength (RSS) corresponding to each of the WLAN access points periodically. Embodiments of the invention provide a method to estimate speed and bearing of the user equipped with a WLAN device based on radio waves received from public and private WLAN access points.

Embodiments of the present invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

Figure 1:
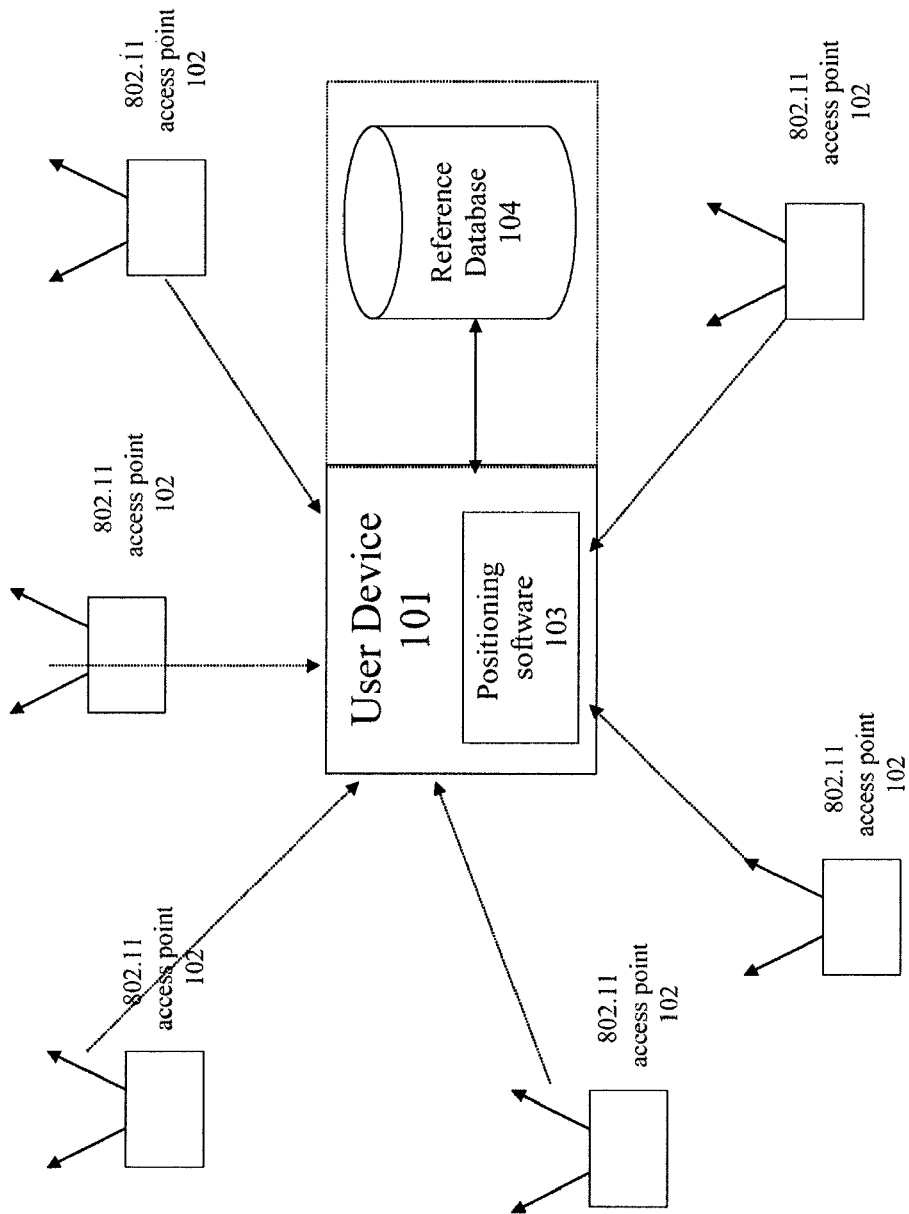
FIG. 1 depicts certain embodiments of a Wi-Fi positioning system.

Embodiments of the invention may be used in a Wi-Fi enabled device to determine speed and/or direction of travel. For example, technique in accordance with embodiments of the invention may be incorporated in logic embedded in a positing software [103] of the Wi-Fi enabled device of FIG. 1.

Figure 2:
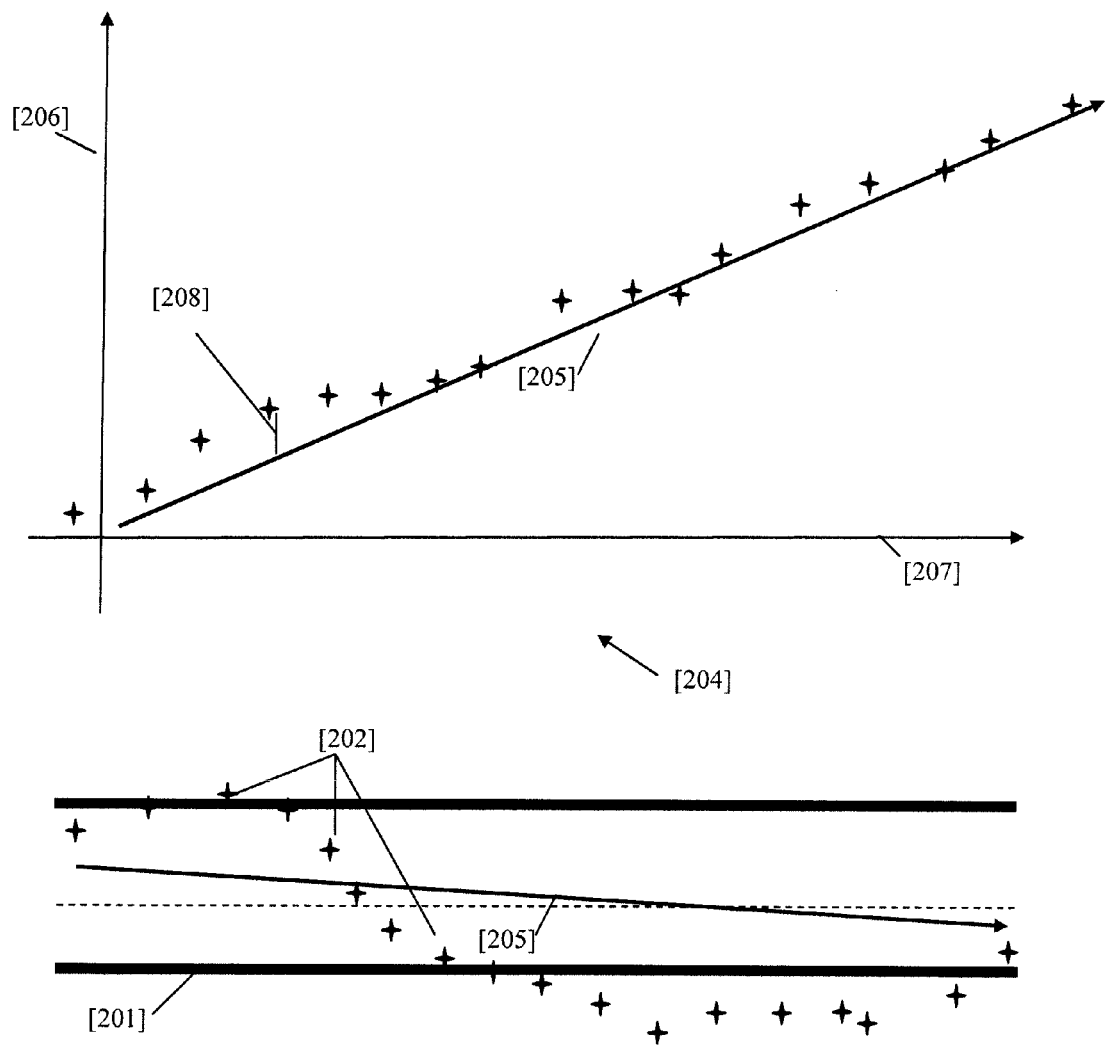
FIG. 2 depicts the estimation of the speed of a user by fitting a line to multiple position estimation points according to certain embodiments of the invention.

Under at least one embodiment of the invention, the speed of a user is estimated based on a numerical derivative of the traveling distance. The method is based on finding the speed of user based on position estimation samples in a WLAN based positioning system. The speed of the user is estimated by fitting a line to traveling distance as a function of time. Therefore, the slope of the line is the speed of the user. FIG. 2 illustrates an example of this method. In FIG. 2, the user is moving along a street [201], and multiple positions [202] are estimated (shown by stars). The distance between the multiple positions [202] may be plotted against times at which the positions are estimated, shown by graph [204]. A line [205] is fit to the distance [206] and time [207] values corresponding to the multitude of position estimations [202]. The slope of the line [205] is the speed of the user.

Under other embodiments of the invention, the speed of a user is estimated based on a numerical derivative of the traveling distance. The invented method is based on finding a lower bound and an upper bound of the user's speed, and then calculating the middle point between them as the best estimate for the speed. These embodiments provide a simple way to calculate the speed of a user.

Methods according to these embodiments use an m number of time-stamped position estimations of the user and corresponding qualities of the position estimations. The number m needs to be set high enough to smooth the results and eliminate estimation noises and sudden changes in speed estimation. On the other hand, the value of m has to be set low enough to track speed changes in a timely manner. The optimum value of m depends on the rate of change of speed of the user and it can also be selected adaptively. An example of a useful value of m is between five and fifteen seconds.

In order to reduce the initial delay of reporting the speed estimated under these embodiments, a rough estimation of speed can be calculated after couple of seconds, e.g., five seconds, and it can be fine tuned after collecting more samples. The optimum number of m may be found empirically.

Methods according to these embodiments operate as follows. Low quality position estimations are eliminated, leaving n number of position estimations of acceptable quality. The median of speed for the n consecutive position estimations is calculated using the distance traveled over time. This is the upper bound of the speed. The average speed is calculated by using the first and the last position estimation. This is the lower bound of the speed. The final speed is calculated as a weighted average of the median and the average speeds.

The median of speed is calculated by first finding the speeds of n consecutive position estimation as follows:

$$V_i = \frac{\Delta d_i}{\Delta t_i} = \frac{d_i - d_{i-1}}{t_i - t_{i-1}}, \quad 1 \le i \le n$$

Next, the n calculated speeds are sorted from minimum to maximum and the middle point is selected as follows:

$$\{V_a, V_b, \ldots, V_k\}, V_a \le V_b \le \ldots \le V_k$$

The average speed is calculated by considering the last position and the first position estimation of the n consecutive position estimation, as follows:

$$\{(d_1, t_1), (d_2, t_2), \ldots, (d_n, t_n)\} \Rightarrow V_{avg} = \frac{d_n - d_1}{t_n - t_1}$$

The last step is finding the final speed by using weighted average of the median and the average speed. The weighting factor is denoted by $\alpha$ as follows:

$$V = \alpha V_{median} + (1-\alpha) V_{avg}$$

The value of $\alpha$ is set to 0.5 to find the mean value. Appropriate values of $\alpha$ may be found empirically depending upon the use of the system. One example of an ideal value of $\alpha$ is 0.5.

Figure 3:
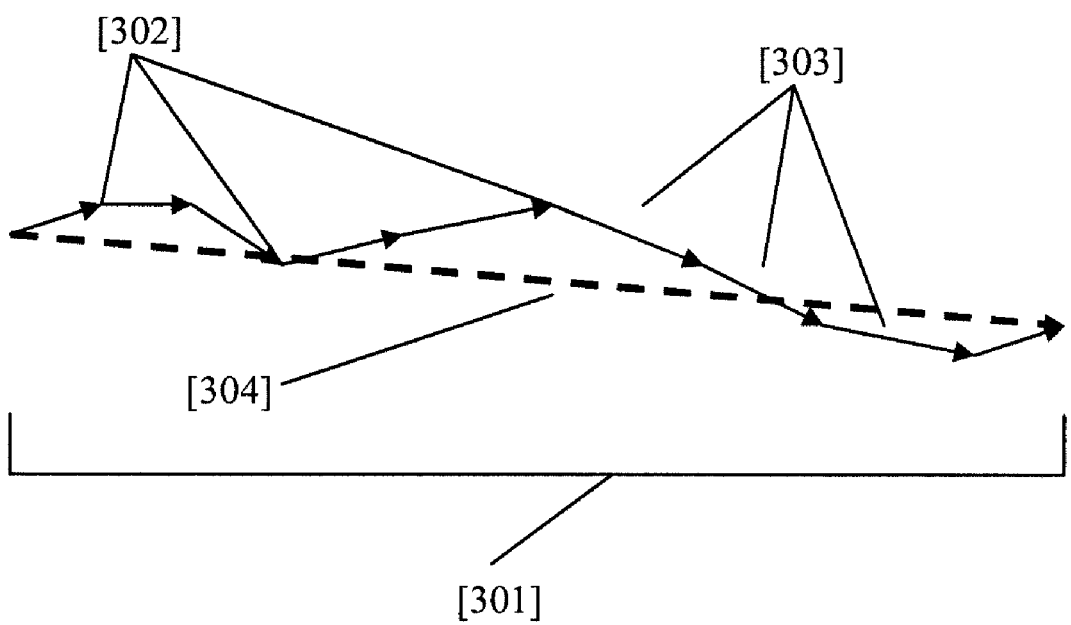
FIG. 3 depicts speed estimation as a numerical derivative of traveling distance according to certain embodiments of the invention.

FIG. 3 depicts an example of the above-described embodiment of speed estimation based on a numerical derivative of the traveling distance. The speed estimation method includes a window size [301], in which positioning samples [302] are used for speed estimation. Multiple speed estimations [303] based on the consecutive position estimations [302], are determined and used to calculate the median speed. The speed estimation based on the first and the last position estimation [304] is determined and used as the lower speed bound. The median and lower speed bound may be combined to find the speed of travel of the user.

Under another aspect of the invention, the number of position estimation samples is changed adaptively according to the rate of change of speed. The number of position estimation samples is adjusted based on average rate of change of speed and not instantaneous variation.

Under another aspect of the invention, the speed of a user is estimated based on numerical derivative of traveling distance by using position estimation samples weighted according to their quality of estimation. The techniques disclosed in the related U.S. Patent Application entitled, Calculation of Quality of WLAN Access Point Characterization For Use in a WLAN Positioning System (incorporated above), may be used to determine the quality of estimation. In a WLAN based positioning system, position of a user is estimated based on received signal strength of radio waves from WLAN access points in range. Position estimation may also tagged with a quality factor which is an indicator of the expected error of position estimation. Embodiments of the invention use position estimation results weighted according to their quality of estimation to calculate the user's speed.

For example, when using the technique of fitting a line to position estimation points to determine speed, the distance of the line to the estimated position points (e.g., [208] of FIG. 2) are weighted according to the quality of the position estimations. Therefore, the line is found in such a way that the weighted distances from the position points to the line are minimized. As another example, when using the technique of finding multiple position estimations and finding the upper and the lower bound of speed, the position estimations having a low quality are ignored. The threshold to select the low quality threshold may be found empirically.

Figure 4:
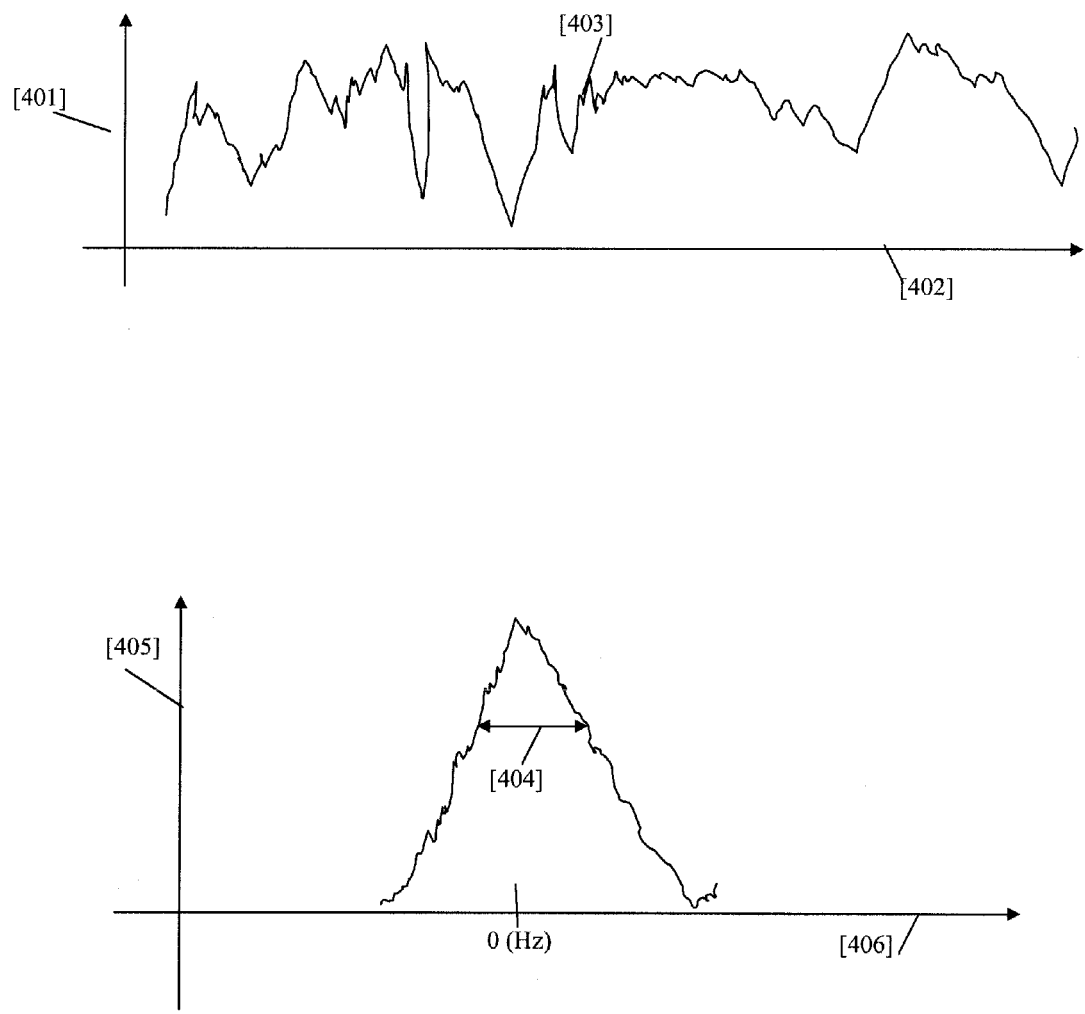
FIG. 4 depicts an example of received signal strength variation over time and an accompanying Fourier transform of the variation.

Under at least one embodiment of the invention, speed of the user is estimated based on measuring the Doppler effect indirectly by measuring power variation of the Received Signal Strength. The power variation is measured by looking at the power samples in the frequency domain by taking Fourier Transform of power samples. The bandwidth of the Fourier Transform of the power samples is then directly correlated with the speed of a user. FIG. 4 shows an example of RSS [401] variation vs. time [402]. An example variation plot is shown by [403]. In other words, signal strength variation is used as an indicator of the speed of the user, and it is mapped into the speed of the user.

The received signal strength may be impacted by the following channel impairments: the distance between a transmitter and a receiver, shadow fading, and multi-path and small fading effect. The distance between the transmitter and the receiver directly impacts the absolute value of the average Received Signal Strength. The relationship between the Received Signal Strength and the distance between WLAN access point and the end user is a function of the environment in which they operate. Shadow fading and multi-path fading are inherently random and cause the Received Signal Strength to vary with time. In the case of stationary user, although shadow and multi-path fading cause power to vary, the variation is limited since only movements of surroundings of the receiver cause power to vary. If a mobile user is considered, the changes and rate of change of surroundings of the receiver is much higher. As a result, the Received Signal Strength variation is higher than for stationary users.

Methods practiced according to these embodiments operate as follows. Received Signal Strength values are collected over a given time window. The time window can be a fixed window or it can be adjusted adaptively according to the rate of change of speed of the user. The adaptive window adjustment based on rate of change of speed of user is more accurate, but window size and acceleration are not linearly dependent. Larger window size avoids big estimation errors due to instantaneous power change, but reduces tracking capability of the estimation. One example of a useful value of the window size is equal to twenty samples, which are one second apart.

A variation is calculated from the Received Signal Strength values. Signal strength variation may be found by determining the bandwidth of a Fourier Transform of samples of Received Signal Strength. The standard deviation of signal strength may also be used as a rough approximation of signal variation. If signal strength variation is below a given threshold, the user is assumed stationary. If it is above the threshold, it is mapped to a value for the speed for the user.

Mapping power variation to speed can be found empirically based on the use cases and the environment in which users operate. The method to map bandwidth of Fourier Transform to speed is as follows. For a given speed of a user, the bandwidth of the Fourier Transform is found. The ratio of the known speed to the bandwidth of the Fourier Transform is denoted by A, and may be found as follows:

$$A = \frac{V_{known}}{BW_{FFT}}$$

The ratio A is used as the conversion factor to map Fourier Transform bandwidth to speed of a user. In summary, bandwidth of Fourier Transform of Received Signal Strength samples of a user is determined, and is multiplied by A to find speed of the user.

FIG. 4 shows one example of Received Signal Strength [401] variation versus time [402] and also the Fourier Transform of the RSS variation, plotting RSS power [405] versus frequency [406], and a corresponding bandwidth [404] of the Fourier transform.

Under one embodiment of the invention, speed estimation is based on average observation (or detection) period of WLAN access points. Observation period is a period of time that a user is exposed to a transmitted signal by an access point in a given time window. A stationary user stays in the coverage area of the same set of access points, but a mobile user detects different access points as the mobile user moves from coverage area of one access point to another.

Figure 5:
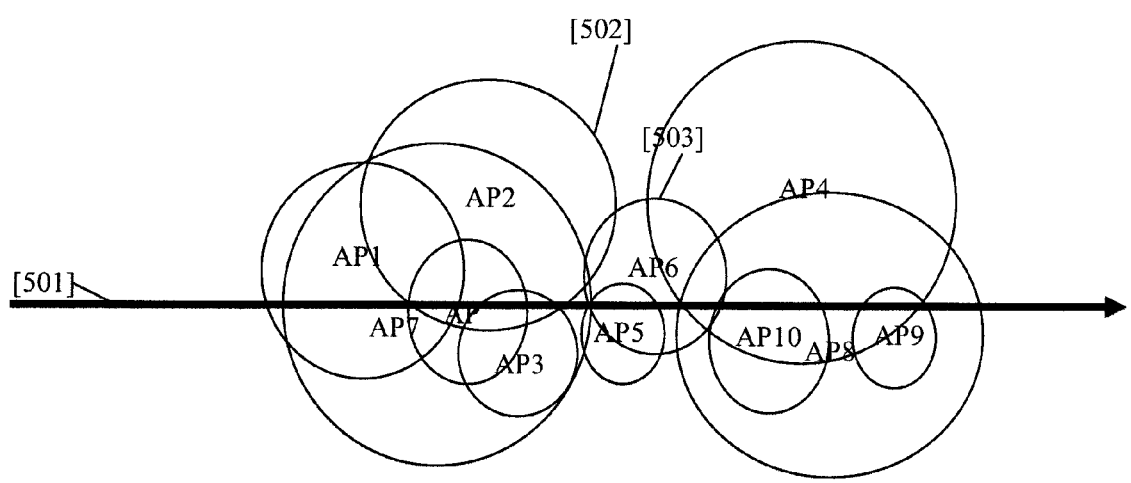
FIG. 5 depicts an example of a user exposed to a multitude of WLAN coverage areas.

FIG. 5 shows an example of a user moving in a given direction, along a user track [501]. There are different access points covering different parts of the moving path, e.g., AP2 and AP6. If a user track [501] is considered, the distances of access points from the user track are a random variable, and coverage of access points can change from one access point to another, e.g., coverage area of AP2 [502] and coverage area of AP6 [503]. Calculation of average observation period is based on all the access points in range regardless of their existence in the reference database [104] (of FIG. 1).

If an access point exists in the reference database [104], the estimation of its coverage area, e.g., [502], is retrieved from the reference database [104], and the coverage area [502] is used to weight the observation period of the access point. If an access point does not exist in the reference database [104], a nominal average coverage area of all access points in the reference database may be used to weight the observation period. In the alternative, a default coverage area value may be used.

In order to calculate the average observation period, a time window of W is considered to collect Received Signal Strength samples and calculate average observation period. A total number of access points detected during time window W is m, in which $m_1$ exist in the reference database [104] and $m_2$ do not. If observation period of access point i is denoted by $t_i$, and the coverage area is denoted by $C_i$, and the nominal average coverage area of all access points in the reference database [104] is denoted by C, the average observation period is calculated as follows:

$$\bar{t} = \frac{\sum_{i=1}^{m_1} \frac{t_i}{C_i} + \frac{\sum_{i=1}^{m_2} t_i}{C}}{m}$$

The average observation period is translated to the speed of the user by finding average distance that the user moves in a given access point coverage area. The average radius of the coverage area [502] of an access point in the reference database [104] is known. Techniques disclosed in the related U.S. Patent Application entitled, Estimation of Position Using WLAN Access Point Radio Propagation Characteristics in a WLAN Positioning System (incorporated above), may be used to determine the average radii of access points.

Figure 6:
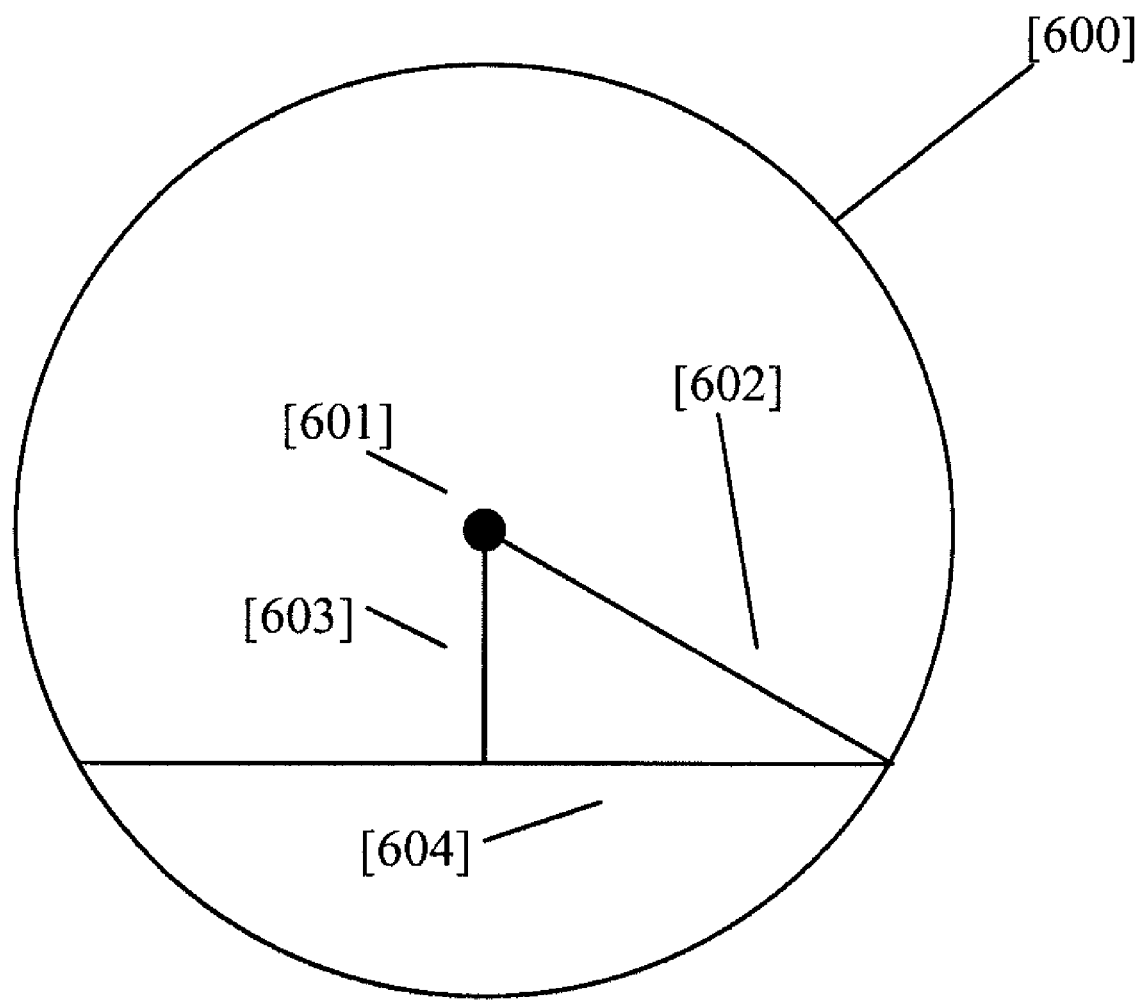
FIG. 6 depicts an example of an access point with the average coverage radius.

Referring to FIG. 6, an access point [601] has a coverage area [600] with a radius of coverage [602], which is denoted by R. A user can detect the access point [601] up to the radius of coverage [602]. Therefore, the average distance of a path of a user from the access point [601] is (R/2) [603]. If the average distance traveled [604] by the user in the coverage area [600] of the access point [601] is denoted by d, it can be calculated as follows:

$$d = 2 \times \sqrt{R^2 - (R/2)^2} = 2R\sqrt{0.75}$$

Because the average time to travel the distance d in the coverage area is the average observation period, the speed of user while traveling in the coverage area [600] of the access point [601] with a known coverage area [600] can be calculated as follows:

$$V = \frac{d}{\bar{t}}$$

Similar methods can be used to determine the speed of the user by using access points not in the reference database [104] by using the average coverage area of all access points in the reference database [104] or by using a default value.

According to embodiments of the invention, the quality of speed estimation of a user may be calculated based on the number of access points used to calculate the average observation period. In addition, if the average observation period of access points calculated by a given user is above a given threshold, the user is stationary. If it is below the threshold, user speed may be calculated. The threshold to detect a stationary user depends on characteristics of the mobility of users and the use case, and may be found empirically.

One example of a useful value of window size to calculate the average observation period is twenty one seconds. One example of a useful threshold to detect stationary users for urban navigation applications is equal to eight seconds.

Under another aspect of the invention, results of different methods of estimating the speed of a user are consolidated into one number by using an adaptive transversal filter. The output of the transversal filter is the optimum linear combination of estimation of the speed of the user. Embodiments of the invention include methods of combining speed estimation results from different sources to find optimum coefficients, corresponding to the sources, to combine the sources linearly. For example, estimation of the speed of the user based on a derivative of distance relative to time, power variation, and average observation period may be consolidated to one number.

Figure 7:
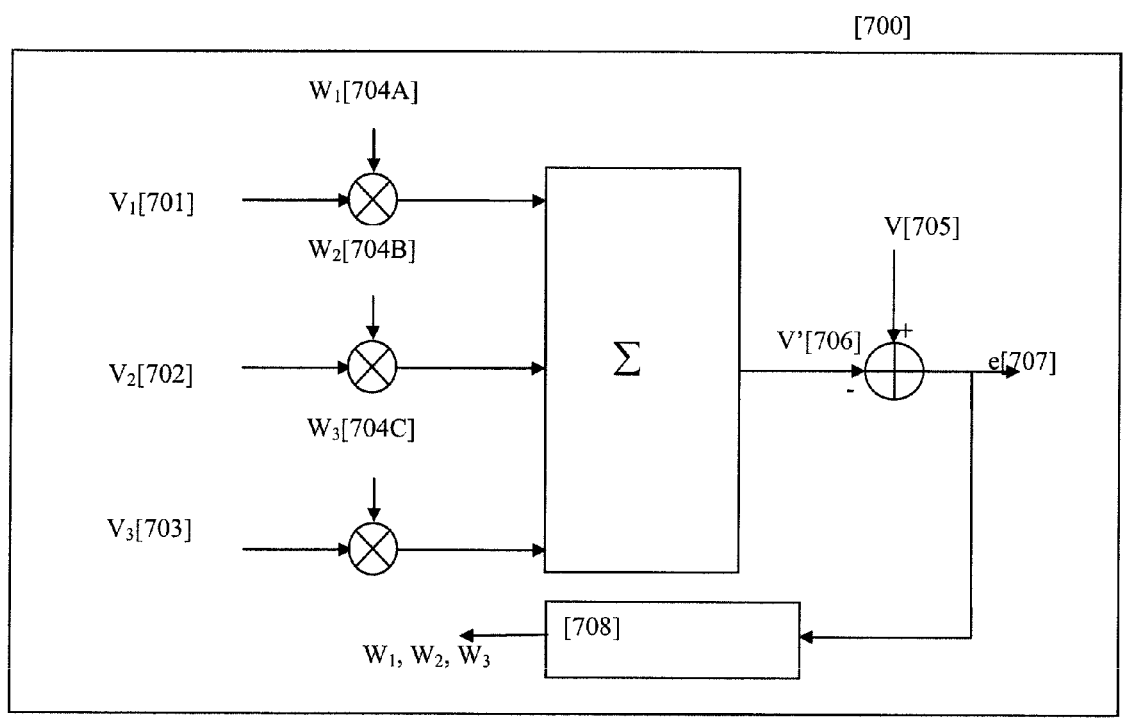
FIG. 7 depicts an embodiment of a transversal filter to find optimum coefficients to linearly combine speed estimations according to certain embodiments of the invention.

An adaptive transversal filter [700] is shown in FIG. 7. The inputs to the transversal filter are different speed estimations $V_1$ [701], $V_2$ [702], and $V_3$ [703]. The speed estimations $V_1$ [701], $V_2$ [702], and $V_3$ [703] are weighted by corresponding coefficients $W_1$ [704A], $W_2$ [704B], and $W_3$ [704C]. The output of the filter V' [706] is compared with the actual speed V [705] of the user, and the residual error, e [707], is used to adjust the filter coefficients $W_1$ [704A], $W_2$ [704B], and $W_3$ [704C]. The value of e is calculated as follows:

$$e = V - V'$$

The value of error, e, is then used to adjust filter coefficients [708]. There are different standard methods to adjust filter coefficients, for example Least Square, Least Mean Square or Recursive Least Mean Square. The optimum filter coefficients $W_1$ [704A], $W_2$ [704B], and $W_3$ [704C] need to be found once, and after that they can be used to combine different speed estimations of different methods. Practically, a test bed is created and it is moved the same way as the user based on the desired use case.

One example method of getting the actual speed V [705] of the user for determining the filter coefficients $W_1$ [704A], $W_2$ [704B], and $W_3$ [704C] is using a GPS, because GPS speed estimation is accurate enough for most of the applications. An example test bed is equipped with a GPS and also a WLAN receiver. The speed of the test bed is estimated periodically by using WLAN access points using all the different methods. All the different speed estimations $V_1$ [701], $V_2$ [702], and $V_3$ [703] from the different methods are input to the transversal filter, along with the filter coefficients $W_1$ [704A], $W_2$ [704B], and $W_3$ [704C]. The initial value of coefficients may be set to all equal values, e.g., equal to ⅓. The actual speed is taken from the GPS receiver. The test bed can be moved until the filter coefficients $W_1$ [704A], $W_2$ [704B], and $W_3$ [704C] converge to the optimal value. The optimal value of the filter coefficients $W_1$ [704A], $W_2$ [704B], and $W_3$ [704C] is logged and are used to combine speed estimations as follows:

$$V = \sum_{i=1}^{3} W_i V_i$$

Under another aspect of the invention, zero speed is detected by estimating the speed of the user according to the power variation of the Received Signal Strength method in combination with estimating the speed of the user according to the average observation period method. Combination of the results of these two methods increases the probability of detecting stationary users, and as a result, the thresholds can be set more conservatively to reduce probability of false detection.

Under another embodiment of the invention, a user's WLAN device scans for access points, and none of access points exist in the current reference database [104]. In this case, the user cannot be located, but speed of user can be estimated, because the power variation of the Received Signal Strength method and the calculation of the average observation period method can still be used to estimate the speed of the user. In this case, speed can be used to predict a future user position, although the current position cannot be estimated.

Under another aspect of the invention, the direction of movement, bearing, is calculated based on WLAN signals. Bearing is calculated based on m number of consecutive position estimation samples. The number m needs to be set high enough to smooth the results and eliminate estimation noises and sudden changes in bearing estimation. On the other hand, the value of m has to be set low enough to track bearing changes in a timely manner. Quality of position estimation may be used to weight bearing estimation samples.

An example method for estimating bearing is as follows. Consider the last m position estimations of the user, and exclude low quality position estimations. The number of acceptable quality position estimations is denoted by M. The direction of movement between the first position estimation and the next M−1 position estimation samples is found; bearing calculation of the first position estimation and position estimation i is denoted by B(1,i), 0<i<(M−1). The method next determines the weighted average of the bearing of M−1 results, weighted according to their quality of estimation. If quality of estimation of location estimation i is denoted by $Q_i$, the bearing is calculated as follows:

$$B = \frac{\sum_{i=1}^{M-1} B(1,i) Q_i}{M-1}$$

Figure 8:
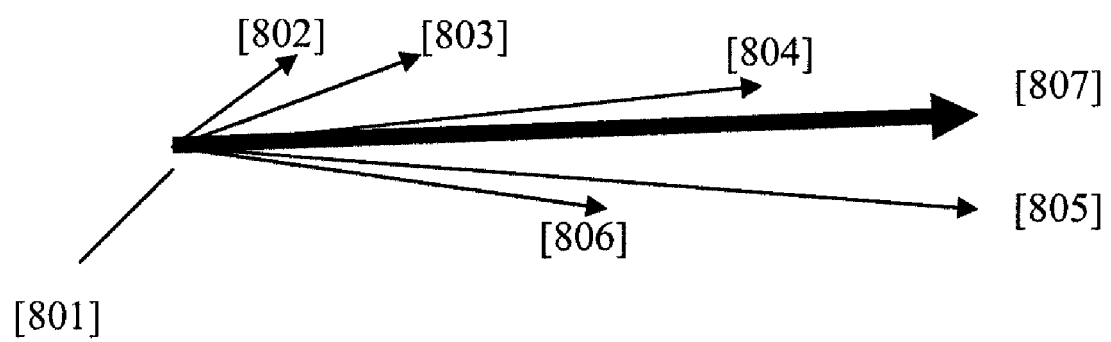
FIG. 8 depicts a method of bearing estimation according to certain embodiments of the invention.

This technique of estimating bearing is shown graphically in FIG. 8. The direction of movement from the first point [801] to all the consecutive points [802]-[806] is calculated for M number of points (six in this example), and the average of (M−1) is calculated as the actual bearing [807].

The value of M may be found empirically based on the mobility model of users. The mobility model is used to find the average duration that the user takes to change bearing, and also dictates required accuracy and maximum tolerable delay. In a typical navigation application, a useful value of M is 15, with samples being taken at one second intervals. It was also observed that the accuracy of bearing estimation for M less than 10 samples is very poor.

It will be appreciated that the scope of the present invention is not limited to the above-described embodiments, but rather is defined by the appended claims, and these claims will encompass modifications of and improvements to what has been described.

What is claimed is:

1. A method of estimating a speed of travel of a Wi-Fi enabled device without requiring position estimates of the Wi-Fi enabled device, the method comprising:
   the Wi-Fi enabled device receiving signals transmitted by at least one Wi-Fi access point in range of the Wi-Fi enabled device, the receiving occurring over time;
   measuring at least one amount of time during which the Wi-Fi enabled device detects signals transmitted by the at least one Wi-Fi access point;
   determining at least one interval of time based on the at least one amount of time during which the Wi-Fi enabled device detects signals transmitted by the at least one Wi-Fi access point; and
   estimating the speed of travel of the Wi-Fi enabled device based on the at least one interval of time, so that the speed of travel of the Wi-Fi enabled device can be estimated without requiring position estimates of the Wi-Fi enabled device.

2. The method of claim 1, wherein the length of time is determined over a given duration of time, or it is calculated during a limited window of time.

3. A system for estimating a speed of travel of a Wi-Fi enabled device without requiring position estimates of the Wi-Fi enabled device, the system comprising:

a computer readable medium including instructions that when executed cause a computer system to:

measure at least one amount of time during which the Wi-Fi enabled device detects signals transmitted by at least one Wi-Fi access point in range of the Wi-Fi enabled device;

determine at least one interval of time based on the at least one amount of time during which the Wi-Fi enabled device detects signals transmitted by the at least one Wi-Fi access point; and estimate the speed of travel of the Wi-Fi enabled device based on the at least one interval of time, so that the speed of travel of the Wi-Fi enabled device can be estimated without requiring position estimates of the Wi-Fi enabled device.

4. The system of claim 3, wherein the length of time is determined over a given duration of time, or it is calculated during a limited window of time.

* * * * *